United States Patent [19]

Hutchins

[11] Patent Number: 4,980,853

[45] Date of Patent: Dec. 25, 1990

[54] BIT BLITTER WITH NARROW SHIFT REGISTER

[75] Inventor: Edward P. Hutchins, San Jose, Calif.

[73] Assignee: Chips and Technologies, Inc., San Jose, Calif.

[21] Appl. No.: 164,268

[22] Filed: Mar. 4, 1988

[51] Int. Cl.[5] ......................... G06F 7/00; G06F 15/20

[52] U.S. Cl. .................................... 364/900; 364/200; 364/259.5; 364/259.8; 364/238; 364/926.5; 364/965.7; 364/947.6; 364/942; 364/959

[58] Field of Search ... 364/200 MS File, 900 MS File, 364/514, 715.8, 736; 340/800, 801; 382/44, 45; 377/26, 70, 73

[56] References Cited

U.S. PATENT DOCUMENTS

| | | | |
|---|---|---|---|
| 3,311,896 | 3/1967 | Delmege, Jr. et al. | 364/900 |
| 3,961,750 | 6/1976 | Dao | 235/164 |
| 4,317,170 | 2/1982 | Wada et al. | 364/200 |
| 4,339,795 | 7/1982 | Brereton et al. | 364/200 |
| 4,437,166 | 3/1984 | O'Brian | 364/900 |
| 4,653,019 | 3/1987 | Hodge et al. | 364/900 |

OTHER PUBLICATIONS

DP8511 BITBLT Processing Unit (BPU), a National Semiconductor Corporation Preliminary Data Specification.

*Primary Examiner*—Michael R. Fleming
*Assistant Examiner*—Gopal C. Ray
*Attorney, Agent, or Firm*—Townsend and Townsend

[57] ABSTRACT

The present invention provides a fast bit blitter method and circuit which uses less logic than do prior art bit blitter circuits. A circuit built in accordance with the present invention includes four main components each of which only has as many bit positions as does the data bytes that are being shifted. The four main components are a storage register, a multiplexer bank, a multiplexer selector and a barrel shifter. As data words are serially read out of memory, they are temporarily stored in the register. The multiplexer gates selected bit from the word stored in the register, together with selected bits from the next word that appears on the data bus to the barrel shifter. The barrel shifter does the appropriate shifting. Alternatively, the barrel shifter can be located before the multiplexer in the data path. The amount of time required to shift an image using the present invention is approximately the same amount of time required with the prior art, however, the amount of hardware required is substantially less.

25 Claims, 4 Drawing Sheets

BIT BLITTER WITH NARROW SHIFT REGISTER

FIELD OF THE INVENTION

The present invention relates to digital computers and more particularly to a system and method for shifting data across byte boundaries.

BACKGROUND OF THE PRIOR ART

There are many commercially available text books that explain the general operation of displays for personal computers. Two such books are "Inside the IBM PC" by Peter Norton, published by Prentice Hall Press, 1986, and a book entitled "Programmer's guide to PC and PS/2 Video Systems" by Richard Wilton, Microsoft Press, 1988. The background information in these books is hereby incorporated by reference and no explanation of the general operation of video displays will be given herein.

As explained in the above cited references, computers generally store video data in multibit bytes. For example, many computers use eight bit bytes. Each bit in a byte can represent the "on" or "off" status of one pixel on the display. Thus an eight bit byte can represent the "on" or "off" status of eight pixels on the display.

One way to display alpha-numeric characters in such systems is to mandate that each character will not cross a byte boundary. Thus each character or letter fits within a block which is for example, eight bits wide and several lines high. In such a system wide characters and narrow characters must fit within the same size box.

More sophisticated systems require that characters cross byte boundaries. In these more sophisticated systems a character can be positioned starting at any bit position across the screen. Circuitry generally known in the art as "Bit Blitter" circuitry is provided to move characters or other images across byte boundaries.

Existing bit blitters generally utilize a shift register which is twice as wide as the main data path. For example if the system includes eight bit data words, a 16 bit shift register is used. FIG. 1A shows an example of a prior art bit bitter circuit. In the circuit shown in FIG. 1A an image is shown as going from a location in memory bank M1-1 to a shifted position in a memory bank M2-1. In many practical systems memory bank M1-1 and memory bank M2-1 would in fact be the same memory; however, they are shown separate in FIG. 1A for ease of explanation.

In the circuit shown in FIG. 1A data from the image in memory bank M1-1 goes through the memory register MR1-1 into two registers R1-1 and R2-1. Adjacent bytes from memory bank M1-1 are placed in registers R1-1 and R2-1 and then both bytes from registers R1-1 and R2-1 are transferred to shift register S1-1. The data is shifted the desired number of positions and then gated out of the eight high order positions of the shift register to memory register MR2-1. As shown in FIG. 1A the positions of the characters "L" and "T" are shifted by four bit positions as they move from memory bank M1-1 to memory bank M2-1. It is noted that in memory bank M2-1 each of the characters "L" and "T" crosses a byte boundary.

Circuitry which is not shown herein is usually provided to transfer data between registers R1-1 and R2-1 so that a particular byte of data only need be read out of memory M1-1 once.

The operations which occur as byte 2, byte 3, and byte 4 are shifted as shown in FIG. 1B. The special initialization operations that occur with byte 1 are not shown since they are not relevant to the present invention. During the steps designated Step One, Step Two and Step Three, the contents of each of the Registers R1-1, R2-1, and MR2-1 is shown. Furthermore the contents of shift register S1-1 is shown in each step both before and after the shift operation. The data in registers R1-1 and R2-1 coincides with the data in memory bank M1-1, the data in register MR2-1 coincides with the data in memory M2-1. FIG. 1B also shows the data in the shift register S1 before and after the shift operation.

An example of a commercially available Bit Blitter is a circuit marketed by National Semiconductor Corporation and designated the "DP8511 BITBLT Processing Unit". As shown in the specification sheet published by National Semiconductor Corporation for the DP8511 circuit is designed to handle 8 bit bytes and it includes a sixteen bit shift register.

Other prior art bit blitters implemented entirely in software. Bit blitters implemented in software are inherently slower than are bit blitters implemented in hardware.

SUMMARY OF THE INVENTION

The present invention provides a fast bit blitter method and circuit which uses less logic than do prior art bit blitter circuits.

A circuit built in accordance with the present invention includes four main components each of which only has as many bit positions as does the data bytes that are being shifted. The four main components are a storage register, a multiplexer bank, a multiplexer selector and a barrel shifter. As data words are serially read out of memory, they are temporarily stored in the register. The multiplexer gates selected bits from the word stored in the register, together with selected bits from the next word that appears on the data bus to the barrel shifter. The barrel shifter does the appropriate shifting. The shifter can either be located either before or after the multiplexer in the data path.

The amount of time required to shift an image using the present invention is approximately the same amount of time required with the prior art, however, the amount of hardware required is substantially less.

DETAILED DESCRIPTION

Figure 2B:
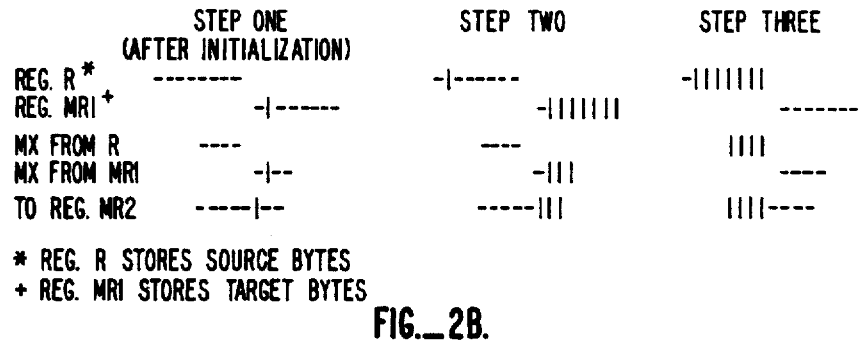
FIG. 2B is a table showing how the circuit in FIG. 2A moves specific bits.
Figure 2A:
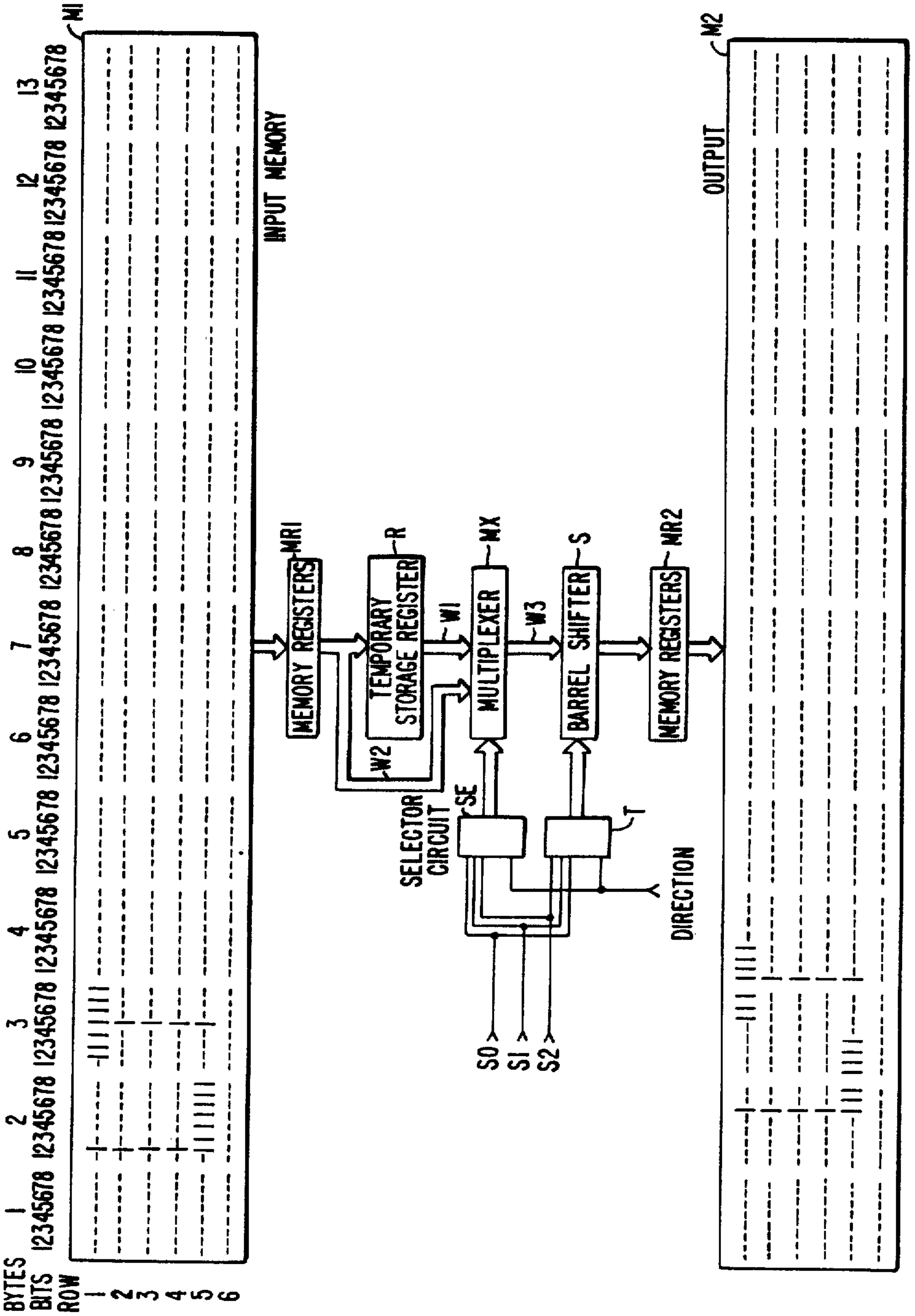
FIG. 2A shows a logical diagram of a preferred embodiment of the invention.

A preferred embodiment of the present invention is shown in FIG. 2A. The embodiment shown in FIG. 2A includes an input memory M1, an output memory M2, memory registers MR1 and MR2, a temporary storage register R, a multiplexer MX, a barrel shifter S, a selector circuit SE, and a two's complement circuit T.

For ease in explanation two memory banks M1 and M2 are shown in FIG. 2A. Memory bank M1 contains an original image of the letters "L" and "T" and memory bank M2 contains a shifted image of the letters "L" and "T". In FIG. 2A, the memory M1 and M2 are shown as having six rows, each row has thirteen bytes, and each byte has eight bits. The bit positions in the memories M1 and M2 are shown by the dashed lines. Naturally it should be understood that most actual computer memories will be much larger than the memories as shown herein; however, the size of the memory is not relevant to the present invention and memories of the size shown are sufficient to explain the present invention. It should be noted that in the shifted image in memory bank M2, the letters "L" and "T" cross a byte boundary.

As explained previously in many practical applications, both the original image and the shifted image would be in the same memory bank: however, whether the two images are stored in the same or in different memory banks is not relevant to the present invention. The situation where one desires to place the shifted image not only in the same memory bank as the initial image but in exactly the same location in memory as the location of the initial image will be discussed later.

The bytes of data come out of memory M1 serially via a memory register MR1 and the shifted data bytes are serially placed in memory M2 via a memory register MR2. This type of memory "read out" and "read in" operation is conventional and will not be explained further.

In the embodiment shown in FIG. 2A, each byte of data has eight bits. In FIG. 2A the bytes and bits are labeled across the top of memory M1 and the rows in the memory M1 are labeled along the left hand side of the memory.

Figure 1A:
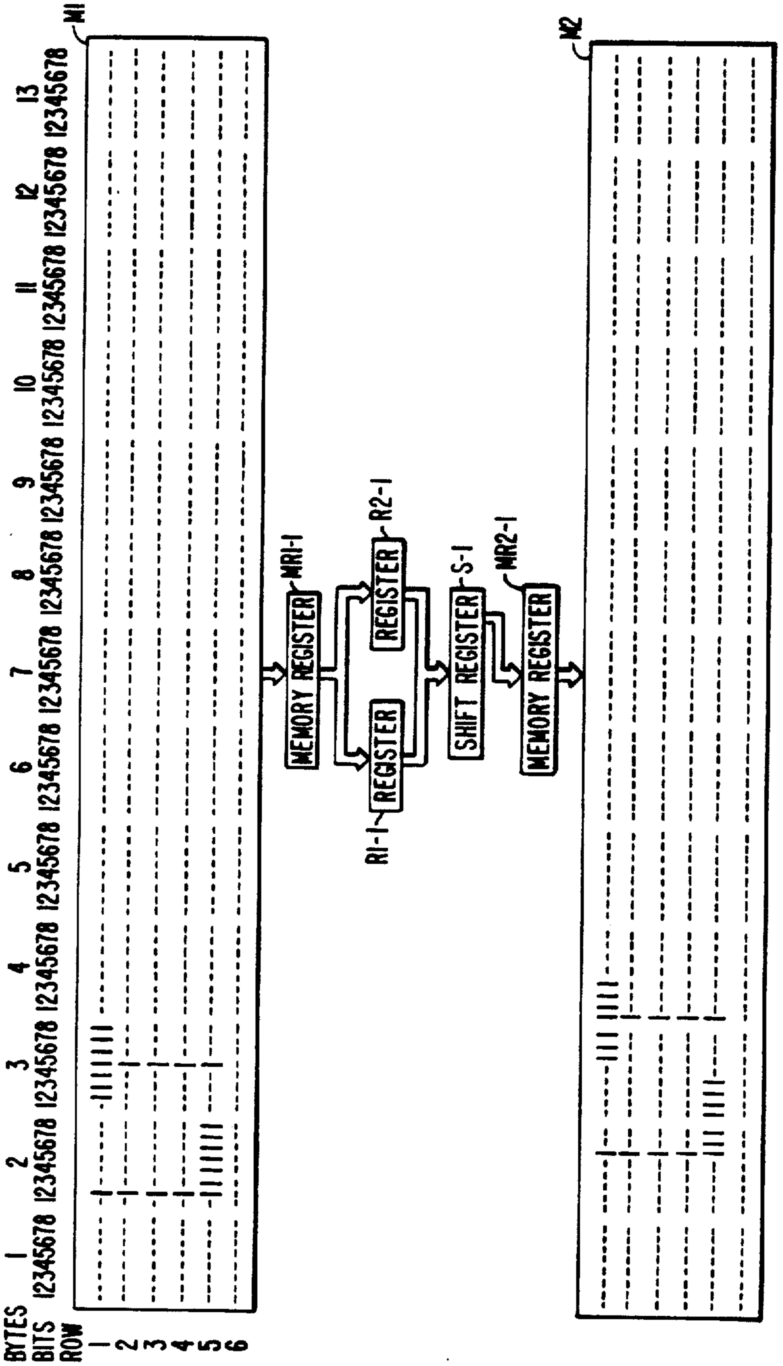
FIG. 1A. PRIOR ART
FIG. 1A shows a prior art circuit.
Figure 1B:
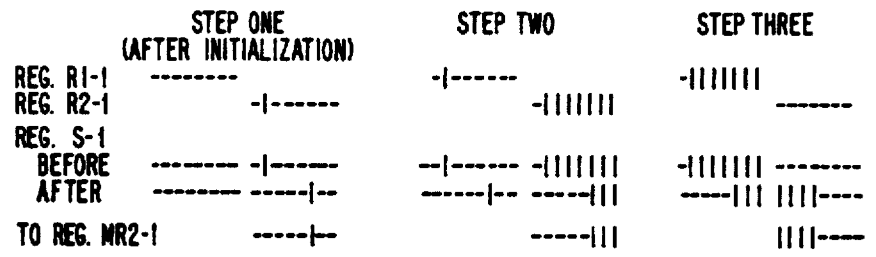
FIG. 1B is a table showing how the circuit in FIG. 1A moves specific bits.

The circuit shown in FIG. 2A has a register R, a bank of multiplexers MX and a shifter S. The register R, the bank of multiplexers MX and the shifter S are each eight bits wide. This is in contrast to the prior art systems much of that which is shown in FIG. 1 where the shifter is sixteen bits wide. The multiplexer MX is controlled by a selector SE and barrel shifter S has a two's complement control circuit T.

The barrel shifter S always shifts to the right. A left shift is accomplished by shifting right an appropriate number of positions. For example, a left shift of 2 is achieved by shifting to the right 6 positions. This is a conventional technique.

Selector SE receives three binary signals S0, S1 and S2 which indicate the amount of shift desired and a direction signal that indicates the direction of the shift. Selector SE decodes the signals on lines S0, S1, and S2 into seven control signals for the bank of multiplexers MX.

Two's complement circuit T receives the three binary signals S0, S1 and S2 and a direction signal. Circuit T performs the following functions:

(a) passes signals S0, S1, and S2 directly to shifter S when a right shift is being performed, (b) generates a two's complement of the signals on lines S0, S1 and S2 and passes the complemented signals to shifter S when a left shift is desired.

The manner in which a barrel shifter designed to do a right shift will perform a left shift when given two's complement input signals is well known and it will not be described further herein.

Figure 3:
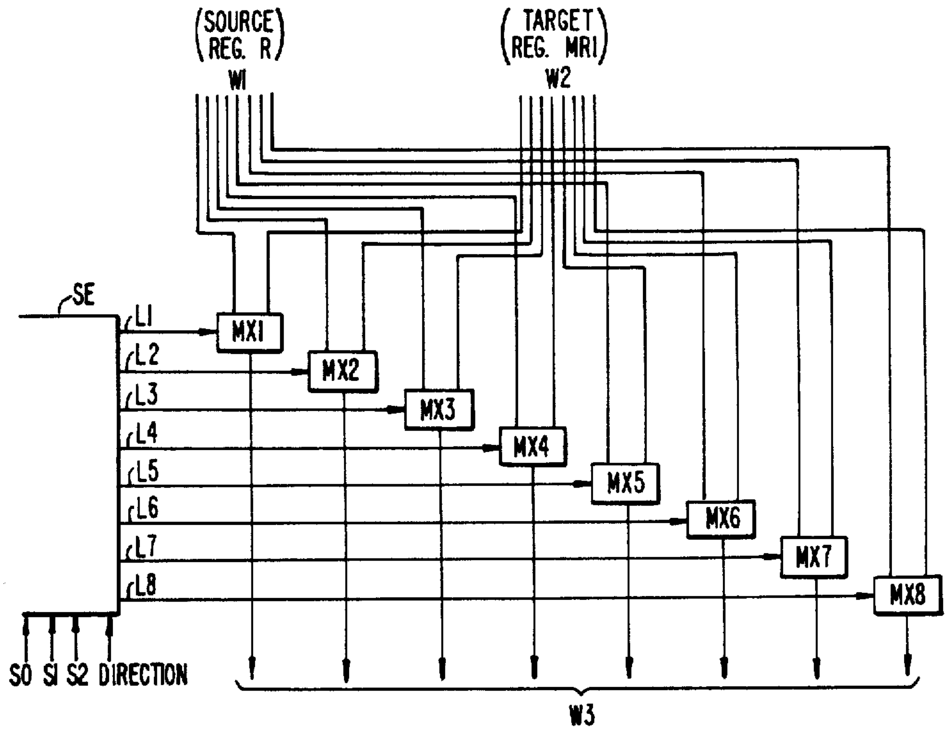
FIG. 3 is a circuit diagram showing the details of how the bank of multiplexers are controlled by the selector.

The details of the bank of multiplexers MX and the manner in which the output of selector SE controls the multiplexer is shown in FIG. 3. The selector SE generates signals on lines L1 to L8 in response to the signals on lines S0, S1 and S2. Signals on lines L1 to L8 in turn control multiplexers MX1 to MX8 each of which either gates a bit from byte W1 or W2 to the output W3. The signals generated by selector SE in response to signals S0, S1 and S2 is shown in the following tables:

TABLE A

For a Right Shift:

| Shift desired | Input Signals SO | S1 | S2 | L1 | L2 | L3 | L4 | L5 | L6 | L7 | L8 |
|---|---|---|---|---|---|---|---|---|---|---|---|
| 0 | 0 | 0 | 0 | 0 | 0 | 0 | 0 | 0 | 0 | 0 | 0 |
| 1 | 1 | 0 | 0 | 1 | 0 | 0 | 0 | 0 | 0 | 0 | 0 |
| 2 | 0 | 1 | 0 | 1 | 1 | 0 | 0 | 0 | 0 | 0 | 0 |
| 3 | 1 | 1 | 0 | 1 | 1 | 1 | 0 | 0 | 0 | 0 | 0 |
| 4 | 0 | 0 | 1 | 1 | 1 | 1 | 1 | 0 | 0 | 0 | 0 |
| 5 | 1 | 0 | 1 | 1 | 1 | 1 | 1 | 1 | 0 | 0 | 0 |
| 6 | 0 | 1 | 1 | 1 | 1 | 1 | 1 | 1 | 1 | 0 | 0 |
| 7 | 1 | 1 | 1 | 1 | 1 | 1 | 1 | 1 | 1 | 1 | 0 |

TABLE B

For a Left Shift:

| Shift desired | Input Signals SO | S1 | S2 | L1 | L2 | L3 | L4 | L5 | L6 | L7 | L8 |
|---|---|---|---|---|---|---|---|---|---|---|---|
| 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 1 |
| 2 | 0 | 1 | 0 | 0 | 0 | 0 | 0 | 0 | 0 | 1 | 1 |
| 3 | 1 | 1 | 0 | 0 | 0 | 0 | 0 | 0 | 1 | 1 | 1 |
| 4 | 0 | 0 | 1 | 0 | 0 | 0 | 0 | 1 | 1 | 1 | 1 |
| 5 | 1 | 0 | 1 | 0 | 0 | 0 | 1 | 1 | 1 | 1 | 1 |
| 6 | 0 | 1 | 1 | 0 | 0 | 1 | 1 | 1 | 1 | 1 | 1 |
| 7 | 1 | 1 | 1 | 0 | 1 | 1 | 1 | 1 | 1 | 1 | 1 |

It is important to note that the present invention does not add any additional delay into the operation of the circuit even though the present invention only requires a shift register which is one byte wide (in contrast to the prior hardware technique art which requires a shift register which is two bytes wide). Thus, the present invention requires less circuitry than does the prior art and it does not increase the time required to operate on the data.

The manner in which the entire circuit operates can be summarized as follows: The input data from memory register MR1 is sent to an end around rotator which consists primarily of register of MR1, temporary register R, multiplexer MX, and barrel shifter S. Every byte which comes out of register MR1 is thus combined with some bits of the previous byte and then written to the destination MR2.

It should specifically be noted that only one read cycle is required regardless of the shift direction and the shift amount.

Figure 4:
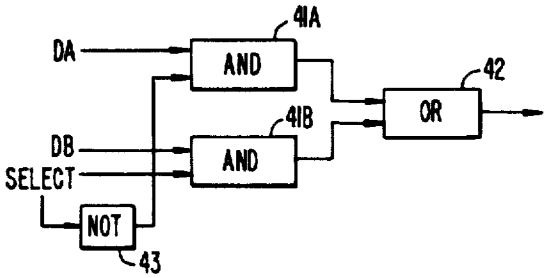
FIG. 4 is a circuit diagram of a single multiplexer stage.

The amount of hardware required and the amount of delay in the circuit can be defined by considering a one bit multiplexer such as that shown in FIG. 4. The one bit multiplexer shown in FIG. 4 has two AND gates 41A and 41B, and OR gate 42 and an Inverter 43. The circuit is a conventional one bit multiplexer and it will be used herein to explain the amount of delay introduced by the present invention in comparison to the prior art. In the subsequent discussion herein, the time required for a signal to pass through the multiplexer shown in FIG. 4 will be considered to be one unit of delay. Furthermore, the amount of hardware in the circuit shown in FIG. 4 will be considered to be one unit of hardware. The circuit in FIG. 4 is not part of the embodiment—it is shown here merely for comparison purposes.

It is known that a 16 bit (two Byte) multiplexer introduces four units of delay whereas an 8 bit (one byte) multiplexer introduces three units of delay. Selector SE and multiplexer MX each introduce one unit of delay. A comparison of the delay introduced by the prior art and the delay introduced by the present invention is given by the "Table C" below. Table C also compares the amount of hardware required by the prior art in comparison to the amount of delay required by the present invention.

TABLE C

| | Prior Art | | Present Invention | |
|---|---|---|---|---|
| | Delay | Hardware | Delay | Hardware |
| Shift Reg. | 4 | 4 × 16 = 64 | 3 | 3 × 8 = 24 |
| Decoder | | | 1 | 8 |
| Selector | | | 0 | 8 |
| Total | 4 | 64 | 4 | 40 |

The two's complement circuitry is not included in the above comparison since it is required by both circuits. Furthermore, since the complementing operation is performed infrequently, in many practical applications, the complementing will be done under program control and no additional hardware will be provided for this function. It is herein shown as a hardware block primarily for the ease of explanation. How the complementing operation is performed is not related to the present invention.

It is noted that the special operations required for handling the first byte in each row and for handling the last byte in each row are not explained since they are not relevant to the present invention and they can be done in the same way that they are done in the prior art.

The operations required when data is being replaced in the same place in memory rather than in a different place in memory are not explained since they can be handled the same way that such operations are handled in the prior art.

As illustrated in FIG. 2A and as described above, in every instance selected bits are taken from a first byte and added to selected bits of a second byte across a byte boundary. The first byte is read from memory M1 and stored in register MR1. The second byte, logically contiguous to the first byte across a byte boundary, is read from M1 into MR1. The first byte is stored in turn to register R. Word line W2 provides an output of register MR1; the second byte, to the multiplexer MX; while word line W1 provides an output of register R to the multiplexer MX. For a right shift of 4 bits, as illustrated, 4 bits are taken from the right-most positions of the first byte, stored in the register R, and 4 bits are taken from the left-most bits of the second byte, stored in register MR1. The multiplexer MX actually selects the desired bits in relation to the byte boundary between them. As will be readily appreciated, multiplexer MX always provides 8 bits to barrel shifter S. Thus, for a 4 bit shift, 4 bits are selected from the first byte and combined with 4 bits from the second byte. As the amount of shift decreases, fewer bits are taken from the first byte, and more bits are taken from the second byte. Conversely, as the amount of shift increases, more bits are selected from the first byte with correspondingly fewer bits selected from the second byte. In practical terms, the first byte becomes a source byte for selected bits to be added to a target byte, referred to above as the second byte.

To facilitate an abstraction of the above-described procedure, the following events occur. As byte 3 of FIG. 2A is loaded into register MR1, byte 2 is loaded in turn into register R. Thus, byte 3 becomes a new target as byte 2 becomes a new source. The same relative bit positions of selected bits of byte 's 2 and 3 are chosen in the same fashion as the selected bit positions of bytes 's 1 and 2, respectively. If the bit positions are numbered logically beginning at each byte boundary across which selected bits from a source to a target will be shifted, it becomes simpler to abstractly state the procedure. For instance, a shift of k bits across a byte boundary between two logically contiguous bytes each having a particular number N of bits, requires that the following bits be chosen: from the source byte, the first k bits relative to the byte boundary will be selected. These k bits will be combined with enough bits of the target byte to provide a total number of bits equal to the particular number N bits. Thus, N-k bits are chosen from the target byte. Specifically, the first N-k bits of the target relative to the byte boundary are combined with the k bits of the source to provide the total number N bits. This is true for a left shift or a right shift. For a left shift, it is readily apparent that byte 13 of FIG. 2A would be read into register MR1. Byte 12 would be read into register MR1, thereby moving byte 13 into register R. Bits are selected from byte 13 in register R and added to bits of byte 12 stored in register MR1. After the bits are combined, byte 11 is read into register MR1, and byte 12 is moved to register R. This corresponds to the description above with register MR1 storing the target byte, register R storing the source byte, and the target byte being "cycled" to become a new source byte as a new target byte is loaded from memory M1.

Figure 5:
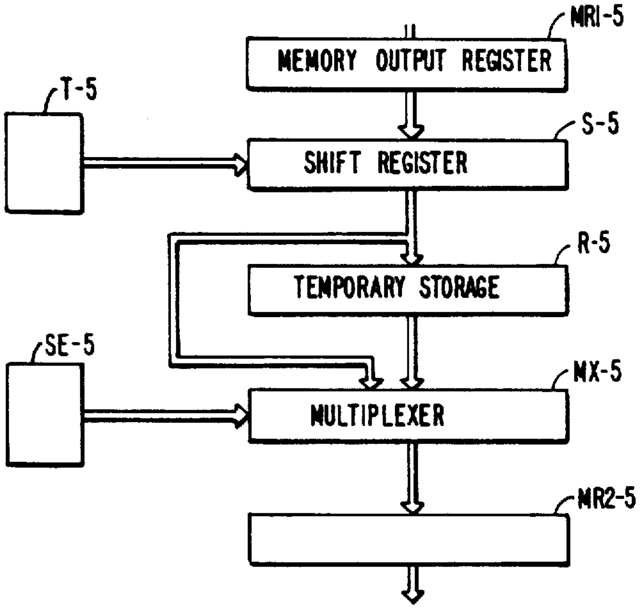
FIG. 5 is a circuit diagram of an alternate embodiment of the invention.

FIG. 5 shows an alternate embodiment of the invention. The various components in the embodiment in FIG. 5 are designated by letters followed by the number 5. The letters correspond to the letters used to designate the similar component in FIG. 24 and the number indicates FIG. 5.

In the embodiment in FIG. 5, the shift register S-5 is located in front of both (a) the temporary storage register R-5 and (b) multiplexer MX-5. The memories M1 and M2 are not shown in FIG. 5 since they are identical to the memory shown in FIG. 2A. In the second embodiment the selector SE-5 and the two's complemant circuit T-5 are identical to the corresponding components in the first embodiment.

The system shown in FIG. 5 operates in substantially the same manner as the previously described system; however, the function of previously given tables A and B is reversed.

With the embodiment in FIG. 5, Table A gives the input signals for a "right" shift and table B gives the input signals for a "left" shift.

The embodiment shown in FIG. 5, has one advantage over the embodiment shown in FIG. 2, namely, the operation associated with the first byte in a row can be handled more easily. Assume for example that characters are being shifted right four bit positions and assume that the first four bit positions in destination memory M2 have information stored therein which is to remain unchanged since the first bit position in memory M1 will be placed in memory position five in memory M2. The operation on the first byte proceeds as follow: the line indicating a shift of zero is activated and the first byte is read from memory M2 into register R-5. Now when the first byte is read from memory M1, it can be combined with the byte in register R-5 in a normal manner to produce the desired result. The same final result with respect to the first byte can be obtained with the first embodiment; however, using the first embodiment additional steps of moving the data under conventional program control are required.

While the invention has been particularly shown and described with reference to preferred embodiments thereof, it will be understood bY those skilled in the art that changes in form and detail may be made therein without departing from the spirit and scope of the invention.

I claim:

1. A bit blitter circuit for shifting data from a first plurality of bytes in a memory to a second plurality of bytes in the memory, each of the bytes having a particular number of bits, comprising:

memory output means for serially reading the data in the first plurality of bytes in the memory;

a register coupled to said memory output means for temporarily storing data previously read from said memory during a prior cycle, said register having a number of positions equal to the particular number of bits;

a multiplexer bank coupled to said memory output means and said register, said multiplexer bank having a number of multiplexers equal to said particular number of bits, each multiplexer being able to independently gate for each bit position from said memory output means and said register;

a barrel shifter coupled to said multiplexer bank for receiving said independently gated bits, said barrel shifter having said particular number of bits; and a multiplexer selector responsive to a direction signal and a number of bits signal, said selector coupled to said multiplexer bank for selectively gating said particular number of bits by selectively gating for each bit position a bit from said memory output means or from said register through said multiplexer bank to said barrel shifter, whereby said data is shifted as said particular number of bits are selectively gated through said multiplexer bank and said barrel shifter shifts said particular number of bits in response to said direction signal and said number of bits signal.

2. A bit blitter system for shifting the location of data as the data is transferred from a first plurality of bytes stored in a memory to a second plurality of bytes in the memory, each of the bytes having a particular number of bits, said system comprising:

reading means for reading the bytes from the memory;

means, coupled to said reading means, for temporarily storing a last read of said bytes;

a barrel shifter having as many bit positions as the particular number of bits; and multiplexer means, responsive to a direction signal and number of bits signal and coupled to said reading means and to said temporary storage means, for selectively gating said particular number of bits by selectively gating for each bit position a bit from said bytes that are read from said memory or from said bytes that are temporarily stored, to said barrel shifter;

whereby the data is selectively shifted as said particular number of bits are selectively gated through said multiplexer means, and said barrel shifter shifts said particular number of bits in response to said direction signal and said number of bits signal by a desired number of bits.

3. The system recited in claim 2 wherein said means for temporarily storing the last read of said bytes is a temporary register which is one byte wide.

4. In a system which stores data in a memory, the data being stored utilizing a plurality of bytes each of which has a plurality of bits, a subsystem for shifting the data across a byte boundary, comprising:

an input register and a temporary storage register;

means for transferring data from the memory to said input register, and then to said temporary storage register;

an end around shift register coupled to said transferring means; and a multiplexer for gating selected bits of the plurality of bits of the plurality of bytes by selectively gating for each bit position a bit from said temporary storage register or said input register to said end around shifter in response to a direction signal and a number of bits signal;

whereby the data is shifted across a byte boundary by gating selected bits from said two registers to said shifter and by then shifting said selected bits a selected amount.

5. The system recited in claim 4 wherein said end around shifter is one byte wide.

6. The system recited in claim 4 wherein said temporary storage register is one byte wide.

7. The system recited in claim 1 including means for providing a control signal to said barrel shifter, and means for generating the two's complement of said control signal.

8. The system recited in claim 2 wherein said multiplexer means has as many bit positions as said particular number of bits.

9. The system recited in claim 2 wherein said means for temporarily storing has as many bit positions as said particular number of bits.

10. The system recited in claim 2 wherein data is gated from said multiplexer means to said barrel shifter.

11. The system recited in claim 2 wherein data is gated from said barrel shifter to said multiplexer means.

12. A bit blitter circuit for shifting a location of data as the data is transferred from a first plurality of bytes in a memory to a second plurality of bytes in the memory, each of the bytes having a particular number of bits, said circuit comprising:

a barrel shifter, said barrel shifter having a number of bit positions equal to the particular number of bits;

memory output means for serially transferring bytes from the memory to said barrel shifter;

a temporary storage register for temporarily storing said bytes from the output of said barrel shifter, said temporary storage register having said particular number of bit positions;

a number of multiplexers equal to said particular number of bits coupled to said temporary register and to said barrel shifter; and a multiplexer selector responsive to a direction signal and a number of bits of signal, said selector coupled to said number of multiplexers for selectively gating said particular number of bits by selectively gating for each bit position a bit from said barrel shifter or from said temporary storage register to an output, whereby the data is shifted as said particular number of bits are selectively gated and shifted through said multiplexers and barrel shifter.

13. In a system for transferring a number k selected bits of a source byte having a number N bits across a byte boundary to a logically contiguous target byte having the number N bits, each of the bytes having a relative position of its respective bits logically numbered starting from the byte boundary, comprising:

N multiplexers, each having a first and second input and an output responsive to a select signal to gate said first input when said select signal is reset and to gate said second input when said select signal is set, said N first inputs coupled to the first N logically numbered N bits of the target byte and said N second inputs coupled to the first N logically numbered N bits of the source byte;

a barrel shifter having N storage positions, each storage position coupled to an output of one of said N multiplexers, for shifting an order of bits stored in said N storage positions a desired direction and amount in response to a control signal; and a shift control circuit coupled to said N multiplexers and to said barrel shifter to provide, respectively, said select signals and said control signal.

14. The transferring system of claim 13 wherein said coupling of said N first and second inputs further comprises:

a particularly numbered multiplexer x has its first and second inputs coupled to an x logically numbered bit and a $N-x+1$ logically numbered bit.

15. The transferring system of claim 14 wherein said particularly numbered multiplexer x further comprises:

said x logically numbered bit is from said source byte and said $N-x+1$ logically numbered bit is from said target byte for a left shift; and said x logically numbered bit is from said target byte and said $N-x+1$ logically numbered bit is from said source byte for a right shift.

16. The transferring system of claim 15 wherein said shift control circuit further comprises:

means, coupled to said N multiplexers, for gating a first k of said bits of said source byte and a first N-k of said bits of said target byte to said barrel shifter; and means, coupled to said barrel shifter, for selecting said amount of shift to be k bits.

17. The transferring system of claim 16 wherein said target and source bytes are stored in a memory and wherein said N bits are representative of an image to be shifted in response to a direction and amount signal, and further comprising:

a first register;

a second register coupled to said first register;

means, coupled to said first and second registers, for reading said memory and storing said source byte in said second register while said target byte is stored in said first register.

18. A method for transferring a number k selected bits of a source byte having a number N bits across a byte boundary to a logically contiguous target byte having the number N bits, each of the bytes having a relative position of its respective bits logically numbered starting from the byte boundary wherein the bytes store data representative of an image to be moved relative to the byte boundary, comprising the steps of:

providing N multiplexers coupled to the target and source bytes, and providing a barrel shifter having N storage positions;

multiplexing, in response to select signals, N particular bits from the target byte and the source byte to said barrel shifter, said N particular bits comprising:

a first k bits of said N bits of said source byte; and a first N-k bits of said N bits of said target byte; and shifting by k bit positions a plurality of bit positions of said N particular bits while retaining a relative order of said multiplexed N particular bits, said shifted multiplexed N particular bits representative of the image being shifted relative to the byte boundary.

19. In a system for transferring a number k selected bits of a source byte having a number N bits across a byte boundary to a logically contiguous target byte having the number N bits, each of the bytes having a relative position of its respective bits logically numbered, comprising:

N multiplexers, each having a first and second input and an output responsive to a select signal to gate said first input when said select signal is reset and to gate said second input when said select signal is set, said N first inputs coupled to the first N logically numbered N bits of the target byte and said N second inputs coupled to the first N logically numbered N bits of the source byte;

a barrel shifter having N storage positions, each storage position coupled to an output of one of said N multiplexers, for shifting an order of bits stored in said N storage positions a desired direction and amount in response to a control signal; and a shift control circuit coupled to said N multiplexers and to said barrel shifter to provide, respectively, said select signals and said control signal.

20. The transferring system of claim 19 wherein said coupling of said N first and second inputs further comprises:

a particularly numbered multiplexer x has its first and second inputs coupled to each x logically numbered bit.

21. The transferring system of claim 20 wherein said shift control circuit further comprises:

means, coupled to said N multiplexers, for gating a first k bits of said source byte contiguous to the byte boundary and a first N-k bits of said target byte contiguous to said byte boundary to said barrel shifter; and means, coupled to said barrel shifter, for selecting said amount of shift to be k bits.

22. The transferring system of claim 21 wherein said target and source bytes are stored in a memory wherein said bits of said source and target bytes are representative of an image to be shifted in response to a direction and amount signal, and further comprising:

a first register;

a second register coupled to said first register;

means, coupled to said first and second registers, for reading said memory and storing said source byte in said second register while said target byte is stored in said first register.

23. The transferring system of claim 22 wherein said source byte is a lower numbered byte position than said target byte, and wherein said k bits of said source byte comprise a plurality of bit positions, $N-k+1$ through N, of said lower numbered byte and said N-k bits of said target byte comprise a plurality of bit positions, first through N-$k^{th}$, of said higher numbered byte position, and said bytes are gated, if a right shift of k bits across said byte boundary is desired, otherwise;

wherein said source byte is a higher numbered byte position than said target byte, and wherein said k bits of said source byte comprise a plurality of bit positions, first through $k^{th}$, of said higher numbered byte and said N-k bits of said target byte comprise a plurality of bit positions, $k+1^{st}$ through the $N^{th}$, of said lower numbered byte position, and said bytes are gated, if a left shift of k bits across said byte boundary is desired.

24. A method for transferring a number k selected bits of a source byte having a number N bits across a byte boundary to a logically contiguous target byte having the number N bits, each of the bytes having a relative position of its respective bits logically numbered, comprising the steps of:

providing N multiplexers, each having a first and second input and an output responsive to a select signal to gate said first input when said select signal is reset and to gate said second input when said select signal is set, said N first inputs coupled to the first N logically numbered N bits of the target byte and said N second inputs coupled to the first N logically numbered N bits of the source byte;

providing a barrel shifter having N storage positions, a storage position coupled to an output of one of said N multiplexers, for shifting an order of bits stored in said N storage positions a desired direction and amount in response to a control signal;

providing a shift control circuit coupled to said N multiplexers and to said barrel shifter to provide, respectively, said select signals and said control signal;

multiplexing both a first k bits of said source byte contiguous to the byte boundary and a first N-k bits of said target byte contiguous to said byte boundary to said shifter; and shifting said k bits of said source byte and said N-k bits k bit positions in a predetermined direction.

25. A method for transferring a number k selected bits of a source byte having a number N bits across a byte boundary to a logically contiguous target byte having the number N bits, each of the bytes having a relative position of its respective N bits logically numbered, comprising the steps of:

providing a means for reading the bytes from a memory;

providing a barrel shifter having N storage positions, a storage position coupled to a particular one of the N bit positions of said read bytes, for shifting an order of said N bits stored in said N storage positions a desired direction and amount in response to a control signal;

providing a temporary storage register coupled to an output of said shifter, said temporary storage register having N storage locations;

providing N multiplexers coupled to an output of said shifter and said temporary storage registers, each multiplexer having a first and second input and an output responsive to a select signal to gate said first input when said select signal is reset and to gate said second input when said select signal is set, said N first inputs coupled to the first N logically numbered N bits of the target byte and said N second inputs coupled to the first N logically numbered N bits of the source byte;

providing a shift control circuit coupled to said N multiplexers and to said barrel shifter to provide, respectively, said select signals and said control signal;

multiplexing both a first k bits of said source byte contiguous to the byte boundary and a first N-k bits of said target byte contiguous to said byte boundary to said shifter; and shifting said k bits of said source byte and said N-k bits k bit positions in a predetermined direction.

* * * * *